United States Patent [19]

Washizu

[11] Patent Number: 5,098,136
[45] Date of Patent: Mar. 24, 1992

[54] SMALL-DIAMETER PIPE CONNECTOR

[75] Inventor: Katsushi Washizu, Numazu, Japan

[73] Assignee: Usui Kokkusai Sangyo Kaisha Limited, Japan

[21] Appl. No.: 588,676

[22] Filed: Sep. 26, 1990

[30] Foreign Application Priority Data

Sep. 27, 1989 [JP] Japan .................. 1-251238

[51] Int. Cl.$^5$ .......................... F16L 39/00
[52] U.S. Cl. .................. 285/319; 285/375; 285/921
[58] Field of Search ............ 285/375, 319, 921, 267

[56] References Cited

U.S. PATENT DOCUMENTS

| | | |
|---|---|---|
| 1,253,309 | 1/1918 | Ullelund .......... 285/375 X |
| 2,892,991 | 6/1959 | Beebee et al. . |
| 3,169,030 | 2/1965 | Lippincott . |
| 3,453,005 | 7/1969 | Foults . |
| 3,503,637 | 3/1970 | Maeshiba .......... 285/375 X |
| 3,674,290 | 7/1972 | McNally .......... 285/375 X |
| 3,826,523 | 7/1974 | Eschbaugh . |
| 3,933,378 | 1/1976 | Sandford et al. . |
| 4,026,581 | 5/1977 | Pasbrig . |
| 4,035,005 | 7/1977 | DeVincent et al. . |
| 4,074,912 | 2/1978 | Van Bilderbeek et al. . |
| 4,219,222 | 8/1980 | Brusadin . |
| 4,275,907 | 6/1981 | Hunt . |
| 4,451,069 | 5/1984 | Melone . |
| 4,601,497 | 7/1986 | Bartholomew . |
| 4,637,636 | 1/1987 | Guest . |
| 4,637,640 | 1/1987 | Fournier et al. . |
| 4,673,199 | 6/1987 | Renfrew . |
| 4,681,351 | 7/1987 | Bartholomew . |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunningham . |
| 4,793,637 | 12/1988 | Laipply et al. . |
| 4,802,696 | 2/1989 | Choham et al. .......... 285/375 |
| 4,895,396 | 1/1990 | Washizu . |
| 4,913,467 | 4/1990 | Wahizu . |
| 4,915,420 | 4/1990 | Washizu . |
| 4,944,537 | 7/1980 | Usui et al. . |
| 4,946,205 | 8/1990 | Washizu . |
| 4,948,180 | 8/1990 | Usui et al. . |

FOREIGN PATENT DOCUMENTS 593413 5/1959 Italy .
855603 12/1960 United Kingdom .

Primary Examiner—Dave W. Arola
Attorney, Agent, or Firm—Anthony J. Casella; Gerald E. Hespos

[57] ABSTRACT

A small-diameter pipe connector comprises a connector body and a socket body. The connector body has a front cylindrical portion and a rear lock portion and is formed therein with an axial through hole, a small-diameter chamber, and a large-diameter chamber. The socket body has a plurality of resilient pawls. A seal ring is fitted in the small-diameter chamber. A bush is disposed in the rear of the seal ring. A spring is provided such that an expanded portion of a pipe inserted in the small-diameter and large-diameter chambers is pushed against the resilient pawls. Therefore, the pipe connected in the connector does not shift axially and the seal ring wears little even under vibration conditions.

6 Claims, 3 Drawing Sheets

PRIOR ART

SMALL-DIAMETER PIPE CONNECTOR

BACKGROUND OF THE INVENTION

1. Field of the Invention

This invention relates to a small-diameter pipe connector used, particularly under vibration conditions, in combination with metallic tubes or resin tubes (hereinafter referred to as pipes) of comparatively small diameter (no greater than about 20 mm) that are mounted in various machines such as cars to supply oil, air, etc.

2. Description of the Prior Art

A conventional connector of the above type is configured as shown in FIG. 7. Specifically, the connector comprises a connector body 21 and a socket body 28. The connector body 21 has a front cylindrical portion 22 for connection with a pipe and a rear lock portion 23', and is formed therein with an axial through hole 24 and a stepped chamber 23 consisting of a small-diameter chamber and a large-diameter chamber. A seal ring member 26 is fitted in the small-diameter chamber, and a bush member 27 is fitted to a stepped portion of the chamber 23 to retain the seal ring member 26 in place. The socket body 28 has a plurality of resilient pawls 25 ... 25' inwardly inclined and a rear annular base portion 28'. When the base portion 28' of the socket body 28 is fitted with the lock portion 23' of the connector body 21 after the resilient pawls 28' are aligned with elongate openings 29 ... 29' formed in the periphery of the large-diameter chamber, the resilient pawls 25 ... 25' push an expanded portion Po' of another pipe Po inserted in the chamber 23.

The foregoing arrangement utilizes the snap action of the socket body 28, that is, the pipe Po is clamped at its expanded portion Po' by the resilient pawls 25 ... 25' after it is passed between the resilient pawls while spreading them out. Therefore, the gap between the distal end of the resilient pawls 25 ... 25' and the bush member 27 must be set larger than the axial thickness of the expanded portion Po' of the pipe Po. Consequently, the pipe Po connected can shift axially; as a result, the seal ring member 26 wears particularly under vibration conditions, thereby decreasing airtightness, causing leakage, and making connection unstable.

SUMMARY OF THE INVENTION

It is an object of the present invention to provide a small-diameter pipe connector which can prevent axial shifting of a pipe to cause no wearing of a seal ring member even under vibration conditions, thereby keeping sufficient airtightness and preserving reliable and stable connection over a long period.

To accomplish the foregoing object, the present invention provides a small-diameter pipe connector which comprises a connector body having a front cylindrical portion and a rear lock portion and formed therein with an axial through hole, a small-diameter chamber, and a large-diameter chamber, the periphery of the large-diameter chamber having a plurality of elongate openings formed therein, a seal ring member fitted in the small-diameter chamber, a socket body having a plurality of resilient pawls inwardly inclined, and spring means provided such that an expanded portion of a pipe inserted in the small-diameter and large-diameter chambers is pushed against the resilient pawls.

A bush member may be disposed in the rear of the seal ring member. The spring means may be a spring washer disposed in the rear of the bush member. The socket body has a base portion which may be fitted with the rear lock portion of the connector body or disposed in the rear of the seal ring member as to act as the bush member. The resilient pawls may have curved portions for receiving the expanded portion of the pipe.

According to the foregoing arrangement of the present invention, the spring means exerts its urging force in the direction opposite to the insertion direction of the pipe such that the expanded portion of the pipe or the group of resilient pawls is pushed rearward. Therefore, when the pipe is inserted in the connector from the rear side, its expanded portion is blocked by the resilient pawls and pushed by the spring means; as a result, the expanded portion is effectively clamped, the axial shifting of the pipe is prevented, and there is no fear of wearing of the seal ring member even under vibration conditions, thereby keeping sufficient air-tightness and preserving reliable and stable connection over a long period.

DETAILED DESCRIPTION OF THE PREFERRED EMBODIMENTS

Figure 1:
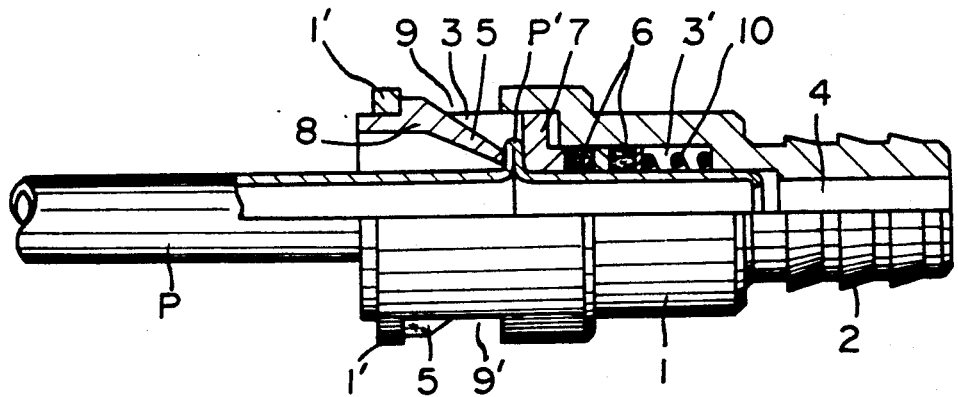
FIGS. 1 through 6 are side views, partly in cross section, showing embodiments of a small-diameter pipe connector according to the present invention.

In FIGS. 1 through 6, a connector body 1 has a front cylindrical portion 2 for connection with a resin tube or rubber hose (not shown) and a rear lock portion 1', and is formed therein with an axial through hole 4, a small-diameter chamber 3', and a large-diameter chamber 3 in that order. A plurality of elongate openings 9 ... 9' are formed in the periphery of the large-diameter chamber 3. A seal ring member 6 made of elastic material such as rubber is fitted in the small-diameter chamber 3' with or without a spacer, and a bush member 7 is disposed in the rear of the seal ring member 6.

In the embodiments shown in FIGS. 1, 3, 5 and 6, a socket body 8 has a plurality of resilient pawls 5 inwardly inclined and a rear annular base portion. When the base portion of the socket body 8 is fitted with the lock portion 1' of the connector body 1, the distal ends of the resilient pawls 5 push an expanded portion P' of a pipe P inserted in the large-diameter chamber 3.

Figure 2:
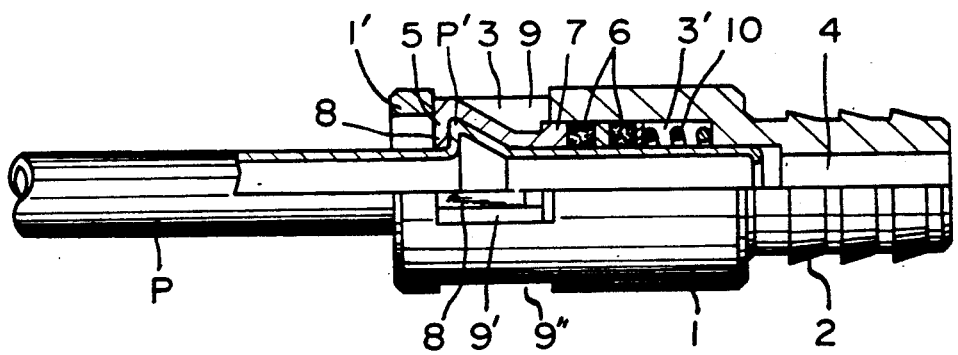
Figure 4:
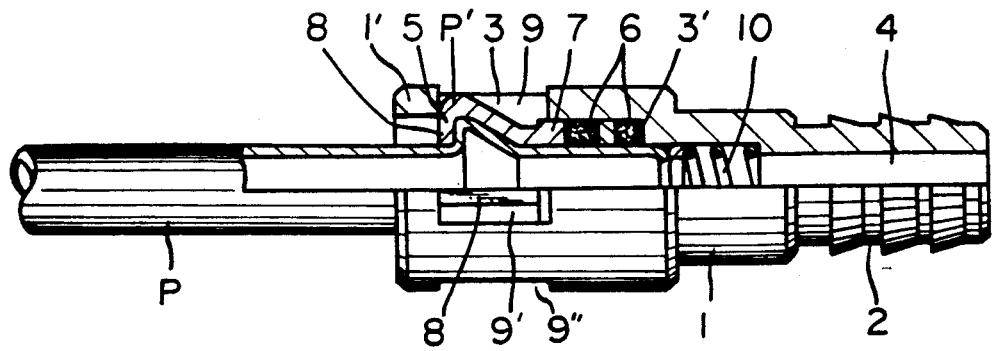

In the embodiments shown in FIGS. 2 and 4, the bush member 7 is made integral with the resilient pawls 5. Specifically, the expanded portion P' is received by curved portions of the resilient pawls 5 held in alignment with the elongate openings 9 ... 9'.

Reference numeral 10 designates a spring means. In FIGS. 1 and 2, the spring means 10 is disposed in the small-diameter chamber 3' as to urge the seal ring member 6, bush member 7, and/or socket body 8 integral with the bush member 7 rearward. Specifically, in FIG. 1, the expanded portion P' whose rear side is blocked by the resilient pawls 5 of the socket body 8 is pushed from the front side, whereas in FIG. 2, the expanded portion P' whose rear side is received by the curved portions of the resilient pawls 5 is pushed from the front side.

Figure 3:
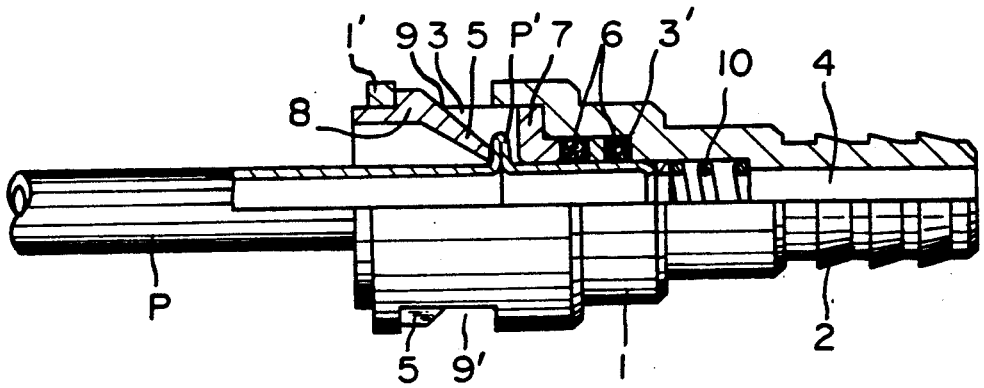

In the embodiments shown in FIGS. 3 and 4, the spring means 10 is disposed in the small-diameter chamber 3' as to urge the pipe P rearward. Specifically, in FIG. 3, the expanded portion P' is pushed against the resilient pawls 5 of the socket body 8 from the front side, whereas in FIG. 4, the curved portions of the resilient pawls 5 are pushed between the lock portion 1' and the expanded portion P'.

Figure 5:
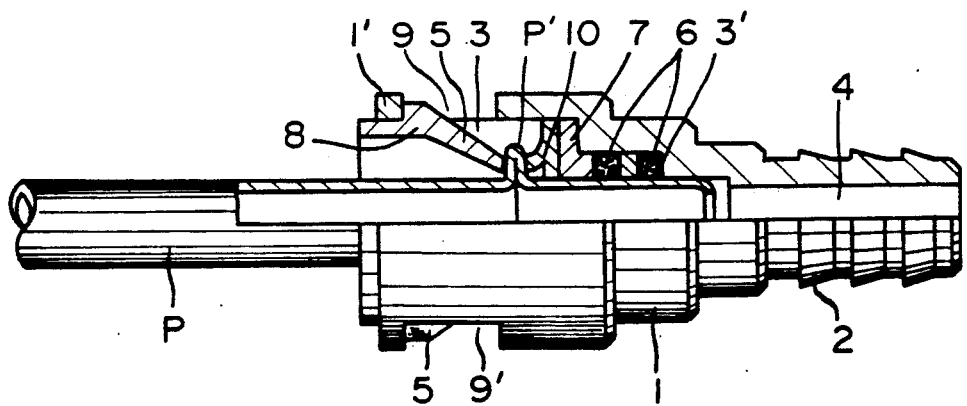
Figure 6:
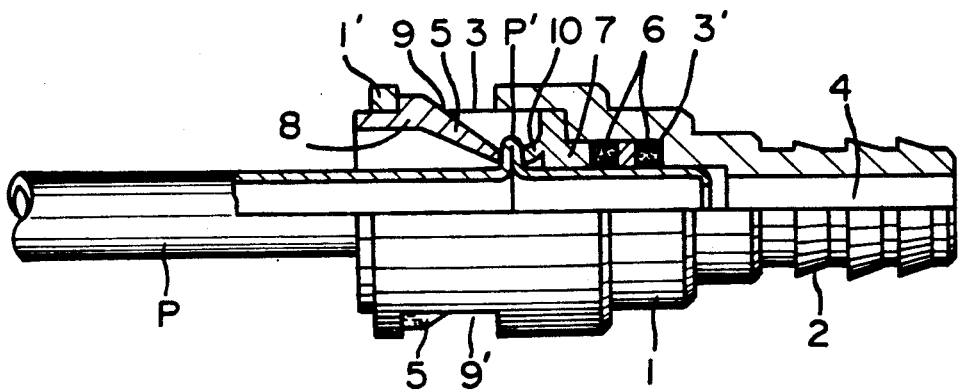
Figure 7:
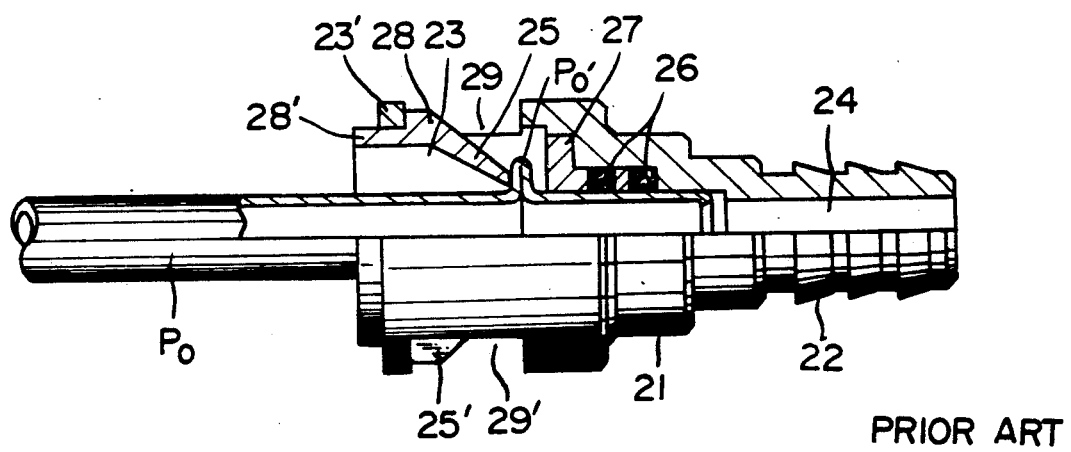
FIG. 7 is a side view, partly in cross section, showing a conventional pipe connector.

In the embodiments shown in FIGS. 5 and 6, the spring means 10 is made in the form of a spring washer which directly pushes the expanded portion P' rearward. Specifically, in FIG. 5, the spring means 10 is disposed in the rear of the bush member 7, whereas in FIG. 6, the spring means 10 is made integral with the bush member 7.

As described above, the small-diameter pipe connector according to the present invention uses the resilient pawls 5 to push the expanded portions P' frontward, and additionally includes the spring means 10 to urge the pipe P or the resilient pawls 5 rearward such that the expanded portion P' is pushed from the front side. That is, the expanded portion P' is effectively clamped by the pushing force of the resilient pawls 5 and of the spring means 10; consequently, the axial shifting of the pipe is prevented, and there is no fear of wearing of the seal ring member 6 even used under vibration conditions over a long period, thereby keeping sufficient airtightness and preserving reliable and stable connection.

What is claimed is:

1. A connector for a small-diameter pipe having a front end and an expanded portion spaced from the front end, the expanded portion defining an axial length, said connector comprising:
    a connector body having a front end and a rear end defining a lock portion and formed therein with an axial through hole extending rearwardly from the front end, a small-diameter chamber rearwardly of the axial through hole and a large-diameter chamber extending from the small-diameter chamber to the rear end of the connector body, with a step defined intermediate the large-diameter chamber and the small-diameter chamber, the portion of the periphery of the connector body surrounding the large-diameter chamber having a plurality of elongate openings formed therein,
    a seal ring member fitted in the small-diameter chamber for sealing engagement with the pipe and small-diameter chamber,
    a socket body having a base portion lockingly engaged with the elongate openings of the connector body and a plurality of resilient pawls inwardly inclined and forwardly projecting from the base portion, and
    a spring washer with a resilient member resiliently projecting rearwardly in the large-diameter chamber, the spring washer being prevented from forward movement by the step between the large-diameter chamber and the small-diameter chamber, the resilient member of the spring washer being spaced forwardly of the pawls by a distance less than the axial length of the expanded portion of the pipe such that the expanded portion of the pipe inserted in the connector body is pushed against the resilient pawls by the resilient member of the spring washer for preventing axial shifting of the pipe in the connector body and thereby preventing wear of the seal ring member.

2. A connector according to claim 1, further including a bush member disposed in the rear of the seal ring member.

3. A connector according to claim 2, wherein the spring washer is disposed in the rear of the bush member so as to directly push the expanded portion of the pipe.

4. A connector according to claim 1, wherein the spring washer is fitted against the step intermediate the large-diameter chamber and the small-diameter chamber for preventing forward movement of the spring washer in the connector body.

5. A connector according to claim 1, wherein the spring washer is fitted around the portion of the pipe intermediate the expanded portion and the front end thereof.

6. A connector according to claim 1 further comprising a bush fitted around the pipe intermediate the expanded portion and the front end thereof, the bush being disposed rearwardly of the sealing means and in engagement therewith, the bush further being seated against the step defined intermediate the large-diameter chamber and the small-diameter chamber of the connector body, the spring washer being fitted around the pipe intermediate the expanded portion and the front end thereof, the spring washer being fitted against the bush for preventing forward movement of the spring washer in the connector body.

* * * * *